May 23, 1972  W. D. FINNEGAN  3,664,816
STEEL-TO-ALUMINUM TRANSITION PIECE
Original Filed Oct. 25, 1966

INVENTOR.
WALTER D. FINNEGAN

Harold H. Jenkins
ATTORNEY

United States Patent Office

3,664,816
Patented May 23, 1972

3,664,816
STEEL-TO-ALUMINUM TRANSITION PIECE
Walter D. Finnegan, Spokane, Wash., assignor to Kaiser Aluminum & Chemical Corporation, Oakland, Calif.
Original application Oct. 25, 1966, Ser. No. 589,304, now Patent No. 3,495,319. Divided and this application June 16, 1969, Ser. No. 833,608
Int. Cl. B23p 3/06
U.S. Cl. 29—196.2
4 Claims

ABSTRACT OF THE DISCLOSURE

A transition insert piece suitable for the fusion welding of aluminum to steel comprising a steel element and a strong aluminum alloy element pressure bonded together through a highly deformable aluminum bonding layer.

BACKGROUND OF INVENTION

This is a division of application Ser. No. 589,304, filed Oct. 25, 1966 now Pat. No. 3,495,319.

This invention relates to a method for forming a transition piece, or transition joint, for welding steel or other ferrous material to aluminum or aluminum alloys, and to the transition piece or joint produced by the method.

It is frequently desirable to employ combinations of materials to obtain the benefit of one or more properties of each, and when combinations employing both aluminum and steel are to be used it is frequently desirable to connect these materials by fusion welding. The light weight, heat conductivity, electrical conductivity, corrosion resistance and other good properties of aluminum are often desired in combination with the high strength, hardness, erosion resistance and elasticity of steel. When the final properties of the combined materials are such that welding is required to connect them, many problems can arise in producing such a connection which frequently are so great that the desirable combination of materials cannot be used.

Steel cannot readily be welded successfully by fusion welding to aluminum, at least not under conditions of normal assembly. Many problems occur in trying to fusion weld steel to aluminum among which are discontinuities in the weld line, weak welds between these incompatible materials, breakage due to differential expansion and contraction, diffusion forming brittle intermetallic compounds at the interface between aluminum and iron, high stresses due to residual strains from the welding operation, and galvanic couples that cause corrosion.

SUMMARY OF INVENTION

It is an object of this invention to avoid or greatly diminish the problems mentioned above by providing a transition joint that can easily be welded to steel on one side, and to aluminum or aluminum alloy on the other side by conventional welding techniques and even by methods of welding usually used only in the field. When it is desired to weld steel to aluminum in accordance with this invention, the connection can be made successfully by placing the transition joint of this invention between the two pieces to be joined, welding the steel piece to the ferrous side of the transition joint and welding the aluminum piece to the aluminum side of the transition joint whereby the welded assembly is produced without the usual problems of joining these two otherwise incompatible materials.

The transition joint of this invention is formed by making a pressure weld between aluminum alloy and steel through a special aluminous bonding element. The method is effected preferably by providing clean surfaces on the steel element and the aluminum alloy element, placing the clean surfaces against opposite sides of a bonding element and subjecting the resultant "sandwich" to a pressure welding treatment to be defined more clearly hereinafter.

The aluminous bonding element is primarily aluminum, preferably aluminum or a soft aluminum alloy, and it is characterized by being more deformable than either the steel or aluminum alloy part of the transition joint, and preferably it is characterized by having either low yield strength or low creep resistance. The latter property is also characterized by being subject to recrystallization at room temperature. The bonding element must be capable of being deformed in a particular dimension by a specific absolute amount which requires it to have at least a certain thickness in that dimension.

Although this invention is not limited to the following explanation, it is thought that elongation of the bonding element fragments oxide films on both the aluminum alloy and steel elements of the sandwich and allows metal to metal contact without an interfering oxide film so that the bond element "wets" both the steel and aluminum alloy elements of the transition joint. In order to make a bond that has adequate strength over a relatively small area, as distinct from cladding where there is little stress over a large area, the bond element must deform by having its thickness reduced at least 0.7 mm., and to be effective as a bonding element, it should be at least 1.5 mm. thick before the pressure bonding that causes its deformation is accomplished. Enough force must be used to deform the bonding element to reduce its thickness at least 0.7 mm. in a single stage compression that may be effected by passing it through rollers, by forging, by explosive deformation or by other equivalent means. Thicker steel and aluminum alloy elements usually need thicker bonding pieces and greater deformation to make entirely satisfactory bonds, but deforming at least 0.7 mm. in a single pass will produce a sound bond. Subsequent passes may reduce the thickness of the bonding element even more, frequently producing an even stronger bond.

As stated hereinabove the bonding element preferably has relatively low yield strength. After pressure welding the deformable bonding element tends to recover and creates tension equivalent to its yield strength. This stress will be reflected in a compression strain in the steel and aluminum alloy elements of the transition joint. If the bond material has low yield strength, the residual stresses set up in the other elements are low. An alternative to low yield strength in the bond, is a bonding material that has low creep resistance, or the ability to recrystallize at room temperature. Such bonding material will creep or recrystallize thereby relieving residual stresses in the bond so that there will not be a residual stress on the steel and aluminum alloy material in the joint. Still another alternative is to employ a bonding material that will stress relieve at temperatures that are too low to affect the properties of the aluminum alloy or steel elements. A transition joint made with such a bonding material may be heat treated to remove residual stresses after bonding.

The preferred transition joint of this invention employs stainless steel as the steel element, and an advantage of such a transition joint is that all bonds are between galvanically compatible materials. At least two interfaces separate materials having large differences in corrosion characteristics. For example, an aluminum-steel bond is an active galvanic couple whereas stainless steel-aluminum bonds or stainless steel-steel bonds are not. Accordingly, in the preferred embodiment all couples between different metals are between compatible metals so that galvanic effects are minimized and assemblies made with the preferred transition joint are less susceptible to corrosion as compared with assemblies of the same materials joined by more conventional means such as mechanical fasteners that hold these materials in direct contact with one another.

To be useful as a transition joint, the aluminum alloy element and the steel element of the joint must be long enough in the direction away from the aluminum-steel bond to accept a fusion weld to steel or another piece of aluminum alloy without disrupting the bond or causing serious heat effects at the bond. The required distance from the bond depends upon the welding technique employed and the thickness of the pieces being joined. Generally speaking, the steel and aluminum alloy elements of the transition joint should extend at least 1 cm. from the pressure bonded interface. To make the transition joint more useful for welding, the steel elements and aluminum alloy elements may be tapered to form single or double V joints with steel and aluminum pieces being joined, or the pieces may be shaped for any other suitable welding technique, again depending upon the technique for joining that is used, the thickness of the pieces being joined and the type of service expected from the assembly.

BRIEF DESCRIPTION OF THE DRAWINGS

The accompanying drawings are provided to illustrate the process and product of this invention.

DETAILED DESCRIPTION

Figure 1:
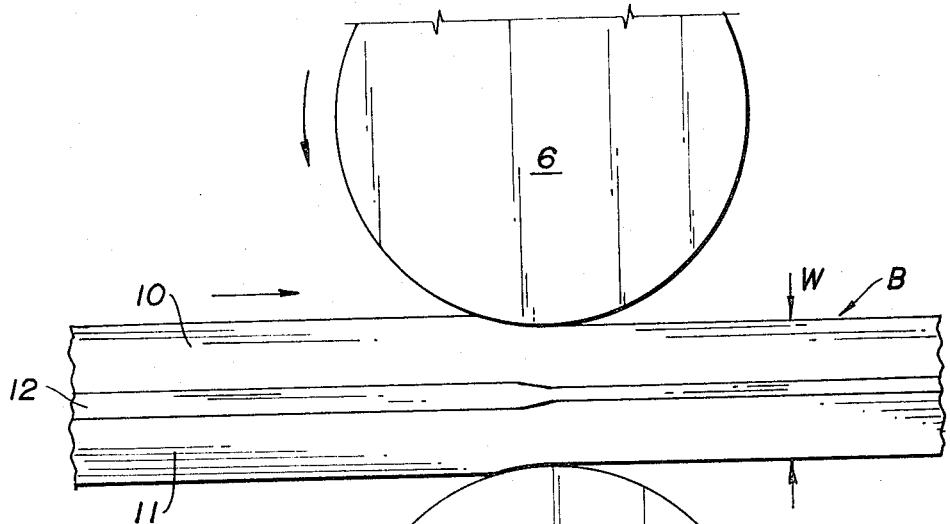
FIG. 1 schematically illustrates the process of the present invention wherein a transition joint is produced.

In FIG. 1, there is shown a process for producing the transition joint of this invention wherein a steel element 10 is placed on one side of a bonding element 12 and an aluminum alloy element 11 is placed on the other side. The prebond sandwich formed by elements 10, 11 and 12 are then fed through rollers 5 and 6 in the direction indicated by the arrows and in passing through the rollers 5 and 6 the size of the element 12 is reduced by at least 0.7 mm. and as a result of this size reduction a pressure bonded transition joint indicated generally as 13 is produced. The transition joints of this invention generally will be made in determinant lengths, either as joints of the specific length required, or in convenient sizes that can be cut to length. Transition joints of this invention are generally not produced as continuous pieces in that elements 10 and 11 are too thick to be coiled on reels and are handled as straight pieces. Generally speaking, the thickness of the transition joint of this invention normal to the plane of the drawing shown as dimension T in FIG. 2 will be the thickness of the pieces to be joined and may range from relatively thin elements with dimension T about 5 mm. to quite thick elements for use in making armored vehicles or pressure vessels that may be as thick as 10 cm. or more.

Figure 2:
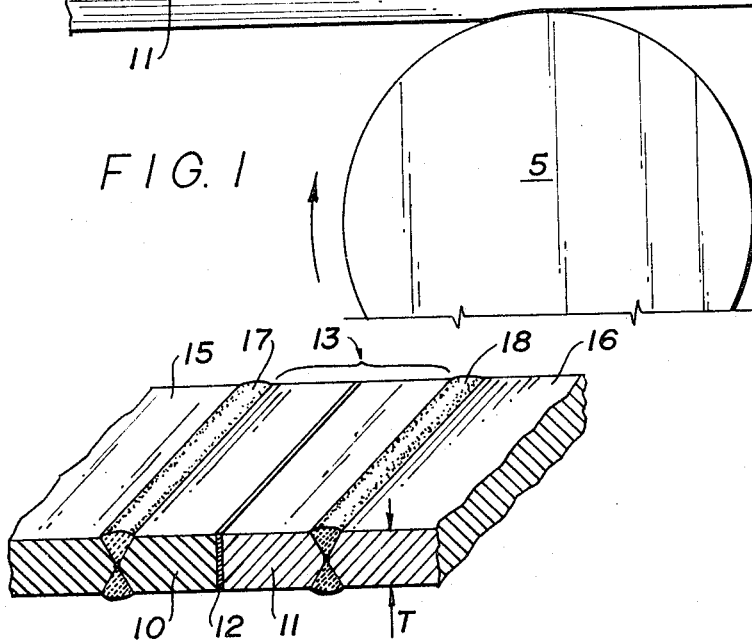
FIG. 2 illustrates a perspective view of the transition joint of this invention as employed in producing an assembly.

FIG. 2 illustrates partially the transition joint of this invention as employed in an assembly. The transition joint of this invention is indicated generally as element 13 made up of a steel element 10 and an aluminum alloy element 11 bonded with bonding element 12. As illustrated elements 10 and 11 have been previously prepared for a double V welding to a steel piece 15 and an aluminum alloy piece 16. The weld 17 is a regular steel weld that may be accomplished with an oxyacetylene torch or electric welding while the weld 18 is an ordinary aluminum-to-aluminum weld that is usually accomplished by techniques known as MIG or TIG which are aluminum welding techniques employing inert gas shields and, respectively, an electrode of filler metal that melts to become the weld material and a tungsten electrode that melts the parent metal 16 and 11 to form the weld material.

The dimension indicated as W in FIG. 1 is the distance between welds 17 and 18 in FIG. 2 and, as stated hereinabove, this dimension is selected so that the performance of the welding operations to join the metals as at 17 and 18 will not affect the bond between elements 10 and 12 or elements 11 and 12, and the dimension W is selected depending upon the types of material employed, and the thickness of the material being joined which is indicated as dimension T in FIG. 2. The dimension T of the transition joint 13 will be selected to be appropriate for the thickness of the pieces 15 and 16 that are to be joined by welding.

As a specific example of the present invention, a transition joint is produced with a stainless steel element of 18–8 stainless steel and an aluminum element of 7039 aluminum. The stainless steel element is a steel characterized by containing 18% chromium and 8% nickel alloyed with iron while the 7039 aluminum is the American Aluminum Association designation for an alloy containing from 2.3 to 3.3% magnesium, from 3.5 to 4.5% zinc, from 0.1–0.4% manganese and from 0.15 to 0.25% chromium. Clean surfaces on the 18–8 stainless steel and 7039 aluminum alloy are prepared by belt sanding of at least one surface of each and placing the clean surface of each against opposite sides of a bonding element made of 1100 aluminum, which is the designation of the American Aluminum Association for an aluminum alloy consisting of at least 99% aluminum, and not more than 1% other elements.

The prebond sandwich consists of an element of 18–8 stainless steel that is 5 cm. thick, 7 cm. wide, and of any convenient length, and a piece of 7039 aluminum alloy that is also 5 cm. thick 7 cm. wide, and of the same length as the stainless steel element. Between these elements there is placed a bonding element of 1100 aluminum alloy that is 7 cm. wide, 3 mm. thick and of substantially the same length as the other elements. The cleaned surfaces of the stainless steel and 7039 elements are laid in contact with the 1100 bonding element and the entire assembly is rolled at sufficient pressure to reduce the thickness of the bonding element to 1.65 mm.

From the rolling operation there results a solidly bonded composite of stainless steel and 7039 aluminum alloy which may be cut to any convenient length and trimmed for any type of welding.

The transition piece thus prepared may then be connected, for example, to a steel frame member 7 cm. thick by ordinary electric arc welding of the stainless steel element to the frame, and the aluminum alloy side of the transition joint may be connected as by MIG welding to 7039 aluminum alloy for example, forming the carrying member of a railroad car. The resultant composite provides a strong, firm connection between the steel and the aluminum alloy, avoids severe galvanic corrosion problems and permits joining incompatible materials by fusion welding even with field welding techniques.

Figure 3:
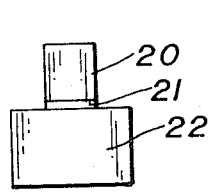
FIGS. 3, 4 and 5 illustrate various forms that the joints of this invention may take.

The present invention may also be employed to join pieces of different thicknesses or at angles to one another. FIG. 3 illustrates a steel element 20 joined through a bonding element 21 to an aluminum element 22 that is substantially thicker than the steel element.

Figure 4:
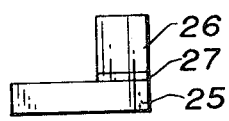

FIG. 4 represents a steel element 25 joined to an aluminum element 26 through a bonding material 27 and in this configuration it is seen that the aluminum element is thicker than the steel element and that the transition joint may form a corner in the assembly.

Figure 5:
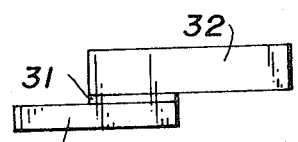

FIG. 5 illustrates still another means for joining different thicknesses of aluminum and steel. In FIG. 5 the steel element 30 is joined to the aluminum alloy element 32 through a bonding element 31 in a lap joint arrangement. The lap joint shown in FIG. 5 has the advantage of providing a bond area 31 as large as desired, and the large bond area is not necessarily associated with a corner as in FIG. 4.

Although this invention has been described with reference to specific materials and configurations, it is broad enough to encompass many variations. The invention is not limited to a transition joint employing only 18-8 stainless steel on 7039 aluminum alloy. Almost any steels may be joined to any aluminum alloy as long as the bonding element between the two is substantially more deformable than either of the other elements of the joint. Also, obviously, any ferrous material may be joined to any aluminum alloy through the transition joint of this invention, and although the invention was described only with reference to a steel frame and 7039 aluminum alloy, these materials were employed for illustrative purposes only, and not to limit the invention. It is apparent that many other variations and applications may be made within the scope of this invention.

What is claimed is:

1. A transition piece suitable for the welding of ferrous metal to aluminum metal comprising a steel element at least 1 cm. thick, pressure bonded to a strong aluminum alloy element at least 1 cm. thick through an aluminous bonding element, said bonding element characterized by being primarily aluminum in composition, being substantially more deformable than either the steel element or the strong aluminum alloy element, and by having been deformed in a one-step compression reduction by at least 0.7 mm. in thickness from its original thickness.

2. The transition piece of claim 1 wherein the steel element is composed of a stainless steel containing about 18% chromium and about 8% nickel.

3. The transition piece of claim 1 wherein the strong aluminum alloy element is an alloy consisting essentially of from 2.3 to 3.3% magnesium, from 3.5 to 4.5% zinc, from 0.1 to 0.4% manganese and from 0.15 to 0.25% chromium, and the balance aluminum and normal impurities.

4. The transition piece of claim 1 wherein the aluminous bonding element is an aluminum alloy containing at least 99% aluminum.

References Cited
UNITED STATES PATENTS

| | | | |
|---|---|---|---|
| 1,667,787 | 5/1928 | Jaeger et al. | 29—470.1 X |
| 2,484,118 | 10/1949 | Reynolds | 29—196.2 X |
| 3,290,129 | 12/1966 | Nock, Jr., et al. | 29—196.2 |
| 3,352,005 | 11/1967 | Avellone | 29—196.2 X |

L. DeWAYNE RUTLEDGE, Primary Examiner

J. M. DAVIS, Assistant Examiner

U.S. Cl. X.R.

29—470.1, 497.5